United States Patent
Saunders et al.

(10) Patent No.: US 10,205,325 B2
(45) Date of Patent: *Feb. 12, 2019

(54) PROVIDING POWER TO INTEGRATED ELECTRONICS WITHIN A CABLE

(71) Applicant: INTEL CORPORATION, Santa Clara, CA (US)

(72) Inventors: Bradley Saunders, Portland, OR (US); Robert Dunstan, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 283 days.

This patent is subject to a terminal disclaimer.

(21) Appl. No.: 15/043,712

(22) Filed: Feb. 15, 2016

(65) Prior Publication Data

US 2016/0226259 A1    Aug. 4, 2016

Related U.S. Application Data

(63) Continuation of application No. 13/681,755, filed on Nov. 20, 2012, now Pat. No. 9,285,853.

(51) Int. Cl.
*H01B 7/30* (2006.01)
*H01B 11/02* (2006.01)
(Continued)

(52) U.S. Cl.
CPC ............ *H02J 4/00* (2013.01); *G02B 6/42* (2013.01); *G06F 1/266* (2013.01); *Y10T 307/25* (2015.04); *Y10T 307/305* (2015.04)

(58) Field of Classification Search
CPC ... Y10T 307/25; Y10T 307/305; G06F 1/266; G02B 6/42
(Continued)

(56) References Cited

U.S. PATENT DOCUMENTS 6,285,092 B1    9/2001   Kawahara et al.
6,735,671 B1    5/2004   Kida
(Continued)

FOREIGN PATENT DOCUMENTS

CN    1677450 A    10/2005
CN    102147650 A    8/2011
(Continued)

OTHER PUBLICATIONS

EP Search Report, EP Application No. 16181708, dated Nov. 26, 2016, 3 pages.
(Continued)

*Primary Examiner* — Rexford Barnie
*Assistant Examiner* — Toan Vu
(74) *Attorney, Agent, or Firm* — International IP Law Group, P.L.L.C.

(57) ABSTRACT

A method of providing power to electronics within a cable is described. The method may include communicatively coupling a first device to a second device via a cable. The cable may include electronic components integrated within the cable. The method may also include providing a signal from the first device to the second device. The method may also include providing, via an internal power line within the cable, power to the integrated electronic components. The method may also include providing, via a device power line within the cable, power between the first device and the second device, wherein the internal power line and the device power line are electrically isolated from one another inside the cable.

6 Claims, 4 Drawing Sheets

(51) Int. Cl.
*H02J 4/00* (2006.01)
*G02B 6/42* (2006.01)
*G06F 1/26* (2006.01)

(58) Field of Classification Search
USPC .................................................... 307/11, 18
See application file for complete search history.

(56) References Cited

U.S. PATENT DOCUMENTS

| | | | |
|---|---|---|---|
| 9,069,540 B2* | 6/2015 | Sultenfuss | G06F 1/266 |
| 9,285,853 B2 | 3/2016 | Saunders et al. | |
| 2004/0136730 A1 | 7/2004 | Fuse et al. | |
| 2007/0122156 A1 | 5/2007 | Wang et al. | |
| 2008/0310848 A1 | 12/2008 | Yasuda et al. | |
| 2010/0057970 A1 | 3/2010 | Kashi et al. | |
| 2010/0090644 A1* | 4/2010 | Nokkonen | G06F 1/26 320/107 |
| 2011/0056399 A1* | 3/2011 | Yan | F42B 3/122 102/215 |
| 2012/0005377 A1 | 1/2012 | Kim et al. | |
| 2012/0005496 A1 | 1/2012 | Baker et al. | |
| 2012/0011286 A1 | 1/2012 | Wong et al. | |
| 2012/0079290 A1 | 3/2012 | Kumar et al. | |
| 2012/0080954 A1 | 4/2012 | Gachon et al. | |
| 2012/0229706 A1 | 9/2012 | Kabuto | |
| 2013/0202285 A1 | 8/2013 | Lecroart et al. | |

FOREIGN PATENT DOCUMENTS

| | | |
|---|---|---|
| CN | 102315881 A | 1/2012 |
| CN | 102740034 A | 10/2012 |
| EP | 1598743 A2 | 7/2004 |
| KR | 20030058745 A | 7/2003 |
| KR | 10947884 A | 3/2010 |
| TW | 179378 | 2/1992 |
| TW | 545706 U | 8/2003 |
| TW | M281230 U | 11/2005 |
| TW | 200931451 A | 7/2009 |

OTHER PUBLICATIONS

International Search Report, PCT Application No. PCT/US2013/070545, dated Feb. 25, 2014, 5 pages.
Taiwan Office Action, Taiwan Invention Patent Application No. 102140880, dated Mar. 9, 2015, 3 pages.
Supplementary European Search Report, Application No. EP13856160, dated May 20, 2016, 3 pages.
Chinese Search Report, CN Application No. 2013800547159, dated Sep. 20, 2016, 2 pages.

* cited by examiner

400

PROVIDING POWER TO INTEGRATED ELECTRONICS WITHIN A CABLE

CROSS REFERENCED TO RELATED APPLICATION

The present application is a continuation application of U.S. patent application Ser. No. 13/681,755, filed Nov. 20, 2012, which is incorporated herein by reference.

TECHNICAL FIELD

This disclosure relates generally to a system, a method, and a cable assembly for providing power to integrated electronics within a cable, and providing power from a first device to a second device. More specifically, a system is described in which a cable provides an internal power line to provide power to the integrated electronics, and a device power line to provide power from the first device to the second device.

BACKGROUND ART

Some cables include integrated electronic components. These cables may be referred to as "active cables." The integrated electronic components may perform operations on a data signal carried across the cable. In order for the integrated electronic components to function properly, power is provided to the integrated electronic components within the cable.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

Description of the Embodiments

The present disclosure relates generally to techniques for providing power to integrated electronics within a cable, and providing power from a first device to a second device, or vice versa. Cables providing power to integrated electronic components within the cable do so by providing power from a through-cable power line which is configured to provide power between a first device and the second device as well as provide power to the integrated electronic components. Rather than providing power to the integrated electronic components and from the first device to the second device via one power line, a cable in accordance with embodiments described herein includes more than one power line. For example, the cable may include an internal power line configured to provide power to the integrated electronic components. The cable may include a device power line configured to provide power from the first device to the second device, or from the second device to the first device. The internal power line, as referred to herein, is a power line configured to provide power to the integrated electronic components and is electrically isolated from the device power line. The device power line, as referred to herein is a power line configured to provide power from the host device to the second device and is electrically isolated from the internal power line. By providing power to the integrated electronic components via the internal power line, independent with respect to the device power line, the integrated electronic components are provided with a consistent source of power.

Figure 1:
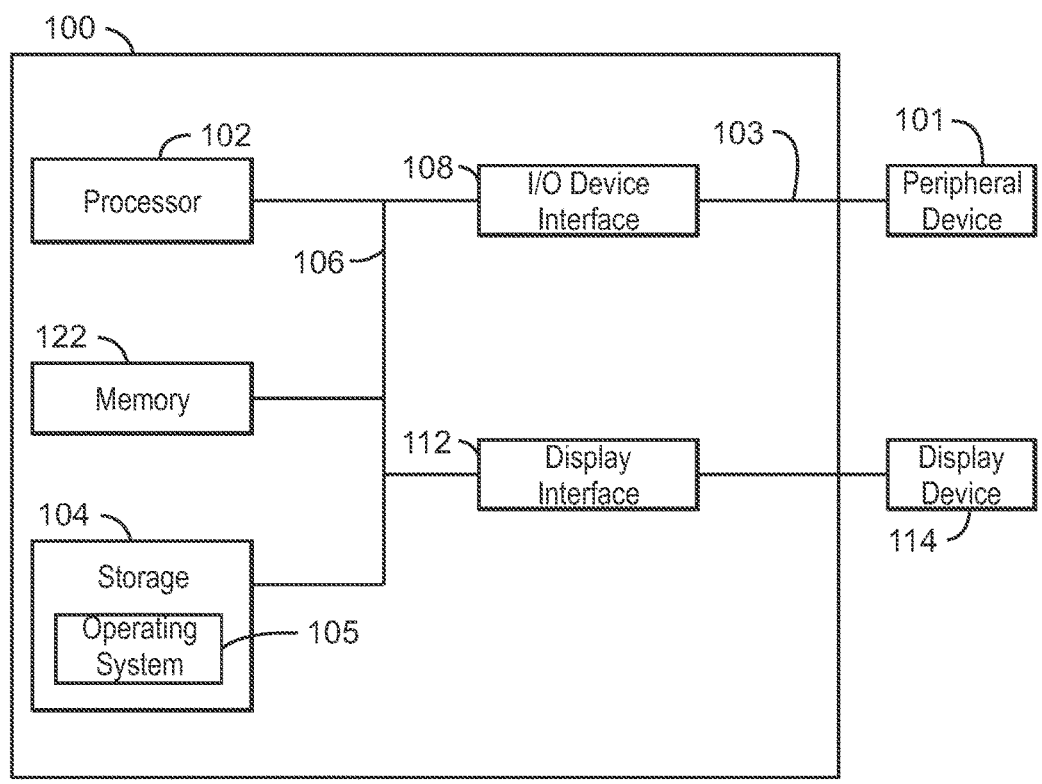
FIG. 1 is a block diagram of system including a first device connected to a second device via a cable.

FIG. 1 is a block diagram of system including a first device 100 communicatively coupled to a second device 101 via a cable 103. The cable 103 may include electronic components integrated within the cable 103. The cable 103 may be configured to provide a signal from the first device 100 to the second device 101. The cable 103 may also be configured to provide a data signal from the first device 100 to the second device 101. The first device 100 may be a host computing device, for example, a laptop computer, desktop computer, tablet computer, mobile device, server, or cellular phone, among others. The first device 100 may include a main processor 102 that is adapted to execute stored instructions, as well as a memory device 122 that stores instructions that are executable by the main processor 102. The main processor 102 can be a single core processor, a multi-core processor, a computing cluster, or any number of other configurations. The main processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the main processor 102 includes dual-core processor(s), dual-core mobile processor(s), or the like.

The memory device 122 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions stored in the memory device 122 and that are executed by the main processor 102 may be used to provide power to the second device 101, and power to electronic components (not shown) integrated in the cable 103.

The main processor 102 may be connected through a system bus 106 (e.g., PCI, ISA, PCI-Express, HyperTransport®, NuBus, etc.) to an input/output (I/O) device interface 108 adapted to connect the first device 100 to a second device 101 via the cable 103. The second device 101 may be a peripheral device and may include, for example, a keyboard and a pointing device, wherein the pointing device may include a touchpad or a touchscreen, a peripheral device such as a camera, a media player, a printer, among others. The first device 101 may be a host computing device similar to the first device 100. The I/O device interface 108 may be configured to provide power to the integrated electronic components of the cable 103 via an internal power line, and may be configured to provide power to the second device 101 via a device power line.

The main processor 102 may also be linked through the system bus 106 to a display interface 112 adapted to connect the first device 100 to a display device 114. The display device 114 may include a display screen that is a built-in component of the first device 100. The display device 114 may also include a computer monitor, television, or projector, among others, that is externally connected to the first device 100.

The first device 100 may also include a storage device 104. The storage device 104 may include a physical memory such as a hard drive, an optical drive, a flash drive, an array of drives, or any combinations thereof. The storage device 104 may also include remote storage drives. The storage device 104 may also include an operating system 105. The storage device 104 may store instructions thereon to provide support for providing power to the integrated electronic components of the cable 103, and the second device 101. Although not shown in FIG. 1, the cable 103 may have an internal power line integrated within the cable 103 to provide power to the integrated electronic components, and a device power line integrated within the cable 103 to provide power from the first device 100 to the second device 101. The system of FIG. 1 may be implemented as a cable assembly described below in FIG. 2.

Figure 2:
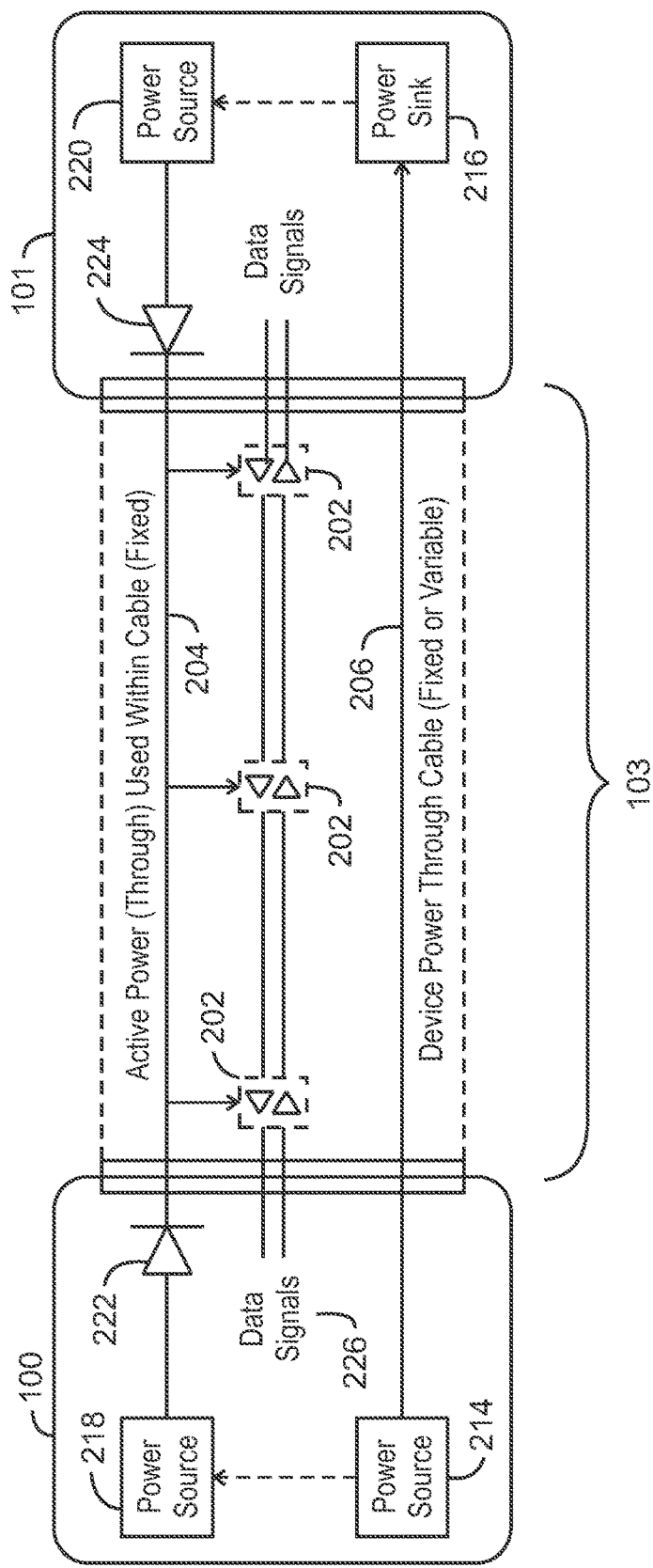
FIG. 2 is a block diagram of a system including a cable assembly of the cable including integrated electronic components, an internal power line, and a device power line.

FIG. 2 is a block diagram of a system 200 including a cable assembly of the cable 103 including integrated electronic components 202, an internal power line 204, and a device power line 206. The cable assembly may include the cable 103, including the electronic components 202 integrated within the cable 103. The cable 103 may communicatively couple the first device 100 to the second device 101. The internal power line 204 may be part of the cable 103 and may be configured to provide power from the first device 100 to the integrated electronic components 202. The device power line 206 may be part of the cable 103 and may be configured to provide a power from the first device 100 to the second device 101, or vice versa.

In some embodiments, the power provided from the first device 100 to the integrated electronic components 202 may be at a fixed voltage. In other embodiments, the power provided to the integrated electronic components 202 may be a dynamic, or variable, voltage based on the requirements of the integrated electronic components 202 at a given time. In other words, the power provided to the integrated electronic components 202 may be based on performance requirements that occur in real-time, or may be a fixed voltage regardless of the performance requirements. The power between the first device 100 and the second device 101 may also vary depending on the power level required by the first device 100 or the second device 101. For example, the first device 100 and second device 101 may negotiate the voltage and current to be delivered to the second device 101. The voltage and current provided to the second device may dynamically adjust during operation. For example, the first device 100 may determine that the second device 101 has powered down or entered a sleep state, in which case, the power source 214 may power down the device power line 206. In other embodiments, the power provided to the device power line 206 may be adjusted independent of any adjustments to the internal power line 204. In other words, the system 200 enables the power provided to each of the internal power line 204 and the device power line 206 to be adjusted independent from each other.

In some embodiments, the first device 100 may include a power source 214 to provide power to the second device 101, wherein the second device 101 includes a power sink 216 configured to receive power from the first device 100. The first device 100 also includes a second power source 218 configured to provide power to the integrated electronic components 202. In other embodiments, the first device 100 may include only one power source, either power source 214 or power source 218, to provide power via the internal power line 204 and the device power line 206 to the integrated electronics 202 and the second device 101, respectively. In some embodiments, the second device 101 may also include a power source 220 configured to provide power to the integrated electronic components 202 via the internal power line 204. The power source 220 of the second device 202 may also provide power to the first device 100 via the device power line 206. In this embodiment, the first device 100 may include an isolation mechanism 222 to reduce back-powering the first device 100 from the second device 101. Likewise, the second device 101 may include an isolation mechanism 224 to reduce back-powering of the second device 101 from the first device 100. The power sources 214, 216, 218, 220 may each supply a fixed range of voltage specifically selected for the I/O technologies served by the cable 103 and the cable characteristics in terms of length, loss, and the like.

The cable 103 may be configured to provide a data signal 226 as well as a power from the first device 100 to the second device 101. The integrated electronic components 202 may include drivers to preserve the integrity of the data signal by, for example, reshaping and retiming the signal. In some cases the cable 103 may be long enough such that the data signal may become degraded, and may therefore lose data signal integrity. In embodiments, the integrated electronic components 202 may perform operations on the data signal. The operations may include any combination of buffering the data signal, reshaping the data signal, retiming the data signal, and the like. For example, the power provided by the internal power line 204 may provide power to the drivers in the integrated electronic components 202 to reshape and retime the data signal 226.

In embodiments, the integrated electronic components 202 may include conversion electronics to convert the data signal from one format into another format. For example, an optical signal may travel longer distances than an electrical signal. The integrated electronic components 202 may include an optoelectronic device configured to convert the data signal from an electronic data signal to an optical data signal. The power provided by the internal power line 204 may provide power to the optoelectronic device to convert the data signal.

Figure 3:
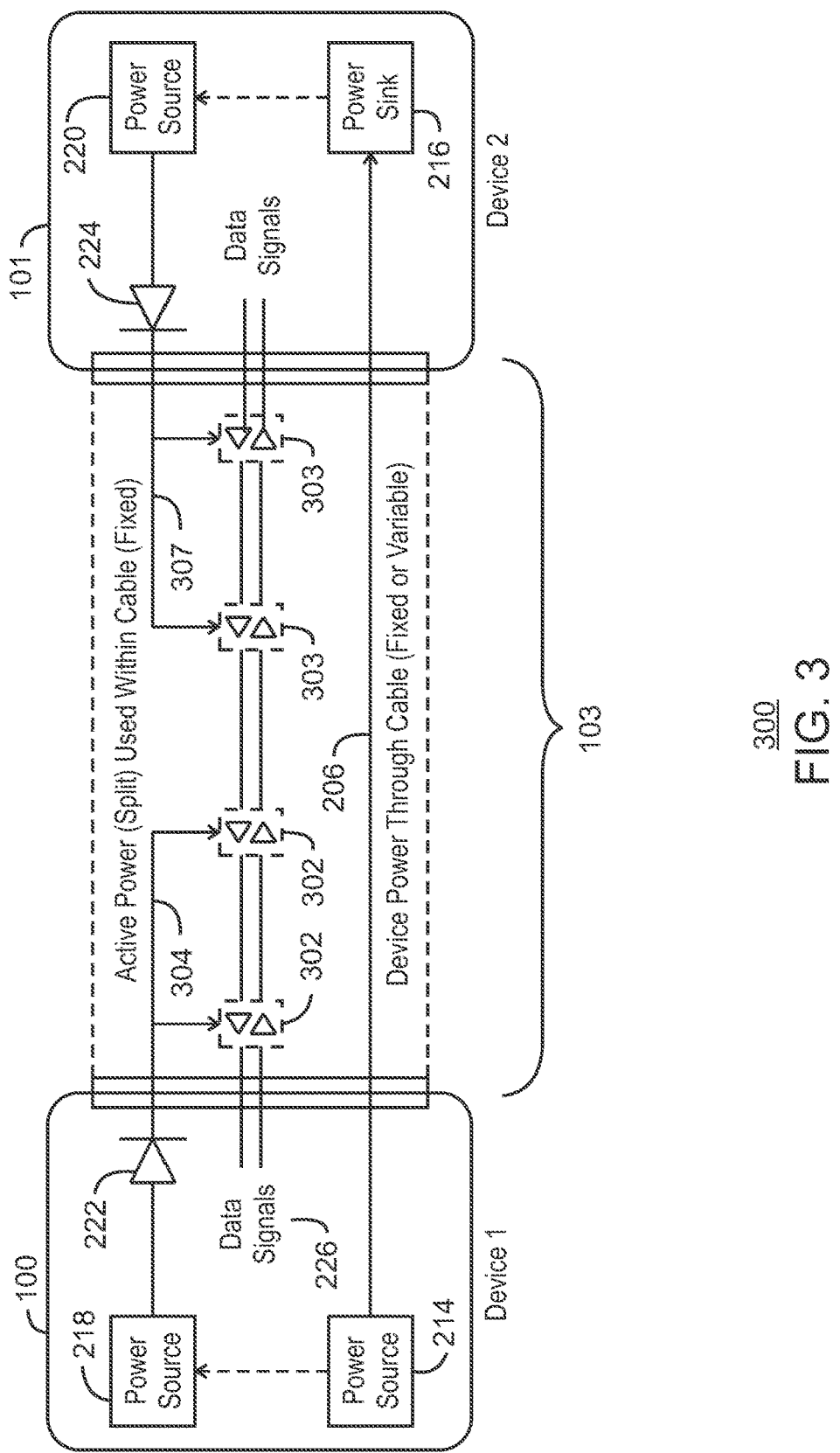
FIG. 3 is a block diagram of a system including a cable assembly of the cable including integrated electronic components, a first internal power line, a device power line, and a second internal power line.

FIG. 3 is a block diagram of a of a system 300 including a cable assembly of the cable 103 including integrated electronic components 302, 303, a device power line 206, a first internal power line 304, and a second internal power line 307. The integrated electronic components 302, 303 may be a part of the cable 103, a part of a connector configured to couple the cable 103 to one or more of the first device 100 and the second device 101. However, the integrated electronic components 302, 303 are not disposed within either of the first device 100 or the second device 101. The integrated electronic components include a first set of integrated electronic components 302 and a second set of integrated electronic components 303. The first internal power line 304 provides power to the first set of integrated electrical components 302 and the second internal power line 307 provides power to the second set of integrated electronic components 303. In other words, the internal power line 202 of FIG. 2 may be split into the first internal power line 304 and the second internal power line 307 illustrated in FIG. 3. The first internal power line 304 may receive power from the power source 218 of the first device 100. The second internal power line 307 may receive power from the power source 220 of the second device 101. The device power line 206 may provide power from the power source 214 of the first device 100 to the power sink 216 of the second device 101, or vis versa. In embodiments, the first internal power line 304 and the second internal power line 307 may be communicatively coupled, in which case, the first device 100 may include an isolation mechanism 222 to reduce back-powering the first device 100 from the second device 101. Likewise, in the case that the first internal power line 304 and the second internal power line 307 are communicatively coupled, the second device 101 may also include an isolation mechanism 224 to reduce back-powering the second device 101 from the first device 100.

In some embodiments, the voltage provided from the first device 100 and the second device 101 via the first internal power line 304 and the second internal power line 307, respectively, may be fixed or may be variable. For example, the power provided by the first power line 304 may be based on the number of integrated electronic components within the first set of integrated electronic components 302. The power provided by the second power line 307 may be based on the number of integrated electronic components within the second set of integrated electronic components 303. In other embodiments, the voltage and current provided from each of the first device 100 and the second device 101, respectively, may be negotiated by a negotiation mechanism within the cable 103. For example, the negotiation mechanism may include detectable termination signatures over the power line. The negotiation mechanism may include a packetized digital communication over one or more of the device power line 206, and the internal power lines, 304, 307. An example of the latter mechanism is found in techniques described in USB Power Delivery Specification.

Figure 4:
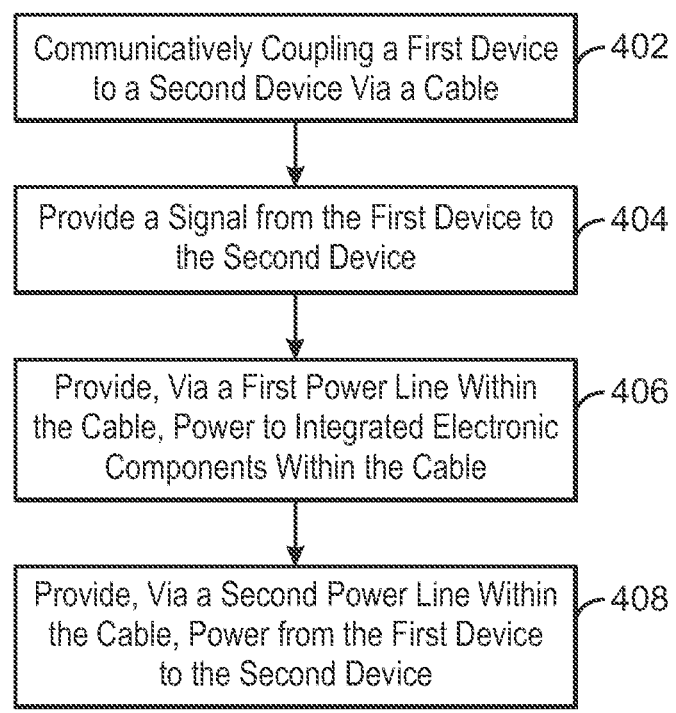
FIG. 4 is a block diagram of a method for providing power from a first device to a second device and providing power to electronic components within the cable.

FIG. 4 is a block diagram of a method 400 for providing power from a first device to a second device and providing power to electronic components within the cable. The method 400 may include communicatively coupling 402 a first device to a second device via a cable, including electronic components integrated within the cable. The method 400 may provide 404 a data signal from the first device to the second device. The method 400 may provide 406, via an internal power line within the cable, power to the integrated electronic components. The method 400 may provide 408, via a device power line within the cable, power from the first device to the second device, or vice versa. The internal power line and the device power line are electrically isolated from one another inside the cable, thereby enabling the integrated electronic components to be powered independent from the power between the first device and the second device via the internal power line.

In embodiments, the method 400 may include performing operations on the data signal via the integrated electronic components. The operations may include any combination of buffering the data signal, reshaping the data signal, retiming the data signal, converting the data signal to a different format, and the like. For example, the integrated electronic components may include drivers, and the operations may include preserving the integrity of the data signal by reshaping and retiming the signal via the drivers. As another example, the integrated electronic components may include conversion electronics, such as an optoelectronic conversion device and the operations may include converting the signal from one format to another, such as from an electronic signal to a data signal.

The integrated electronic components may include a first set of integrated electronic components and a second set of electronic components. In some embodiments, the method 400 may provide power via a first internal power line to the first set of integrated electronic components. The method 400 may also provide power, via a second internal power line integrated within the cable, to the second set of integrated electronic components. The device power line may provide power from the first device to the second device regardless of whether there is a second internal power line providing power to the integrated electronic components.

In some embodiments, the first device and the second device may each include a power source. The power source of either the first device, the second device, or both may provide power to the integrated electronic components. Therefore, the method 400 may also include providing power to the integrated electronic components from each of the first device and the second device. In this embodiment, the method 400 may include an isolation mechanism for reducing back-powering between the first device and the second device.

In some embodiments, the voltage provided to the integrated electronic components may be fixed. Therefore, the method 400 may include providing, via the internal power line, a fixed voltage to the integrated electronic components. In other embodiments, the voltage provided to the integrated electronic components may be dynamic based on the power requirements of the integrated electronic components at any given time. Therefore, the method 400 may include providing, via the internal power line, a dynamic voltage to the integrated electronic components based on the power requirements of the integrated electronic components at a given time. It should be noted that either the first internal power line, or the second internal power line may provide with the fixed voltage or the dynamic voltage depending on whether the second internal power line is present in the cable. In some embodiments, the cable may include one or more cables coupled in series to one another in a string of cables, rather than one cable alone. The string of cables may be of a length at which losses of power may be encountered. Therefore voltage provided from either the host device or the second device must be high enough to account for power loss or signal loss assuring that an adequate level of power can be delivered to the integrated electronic components.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A host apparatus comprising:
   a connector to couple the host apparatus to a device via a cable to provide a data signal from the host apparatus to the device; and
   one or more power sources to provide power through a first power line of the cable to the device and provide power through a second power line of the cable to an electronic component within the cable, wherein the first power line and the second power line are electrically isolated from one another inside the cable.

2. The host apparatus of claim 1, wherein the power source is to provide a fixed voltage through the second power line of the cable to the electronic component within the cable.

3. The host apparatus of claim 1, wherein the power source is to adjust a voltage through the first power line of the cable to the device independent from the power provided through the second power line of the cable to the electronic component within the cable.

4. The host apparatus of claim 1, wherein the power source is to adjust the power provided through the second power line of the cable to the electronic component within the cable.

5. The host apparatus of claim 1, wherein the power source is to provide power through an isolation mechanism.

6. The host apparatus of claim 1, wherein the host apparatus is in compliance with a Universal Serial Bus (USB) Power Delivery Specification.

\* \* \* \* \*